US012299005B2

(12) United States Patent
Sankaranarayanan et al.

(10) Patent No.: US 12,299,005 B2
(45) Date of Patent: May 13, 2025

(54) MODEL MINING AND RECOMMENDATION ENGINE WITH SIMULATION INTERFACES

(71) Applicant: Oracle International Corporation, Redwood Shores, CA (US)

(72) Inventors: Hari Bhaskar Sankaranarayanan, Bengaluru (IN); Rajarshi Bhose, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/541,594

(22) Filed: Dec. 15, 2023

(65) Prior Publication Data

US 2024/0126789 A1    Apr. 18, 2024

Related U.S. Application Data

(63) Continuation of application No. 17/378,173, filed on Jul. 16, 2021, now Pat. No. 11,886,466.

(30) Foreign Application Priority Data

May 26, 2021    (IN) .............................. 202141023390

(51) Int. Cl.
  *G06F 16/00*    (2019.01)
  *G06F 16/28*    (2019.01)
  *G06N 5/04*    (2023.01)
(52) U.S. Cl.
  CPC ............. *G06F 16/285* (2019.01); *G06N 5/04* (2013.01)

(58) Field of Classification Search
  CPC ...................................................... G06F 16/285
  USPC ........................................................ 707/740
  See application file for complete search history.

(56) References Cited

U.S. PATENT DOCUMENTS

2019/0266076 A1\* 8/2019 Maliani ............... G06F 11/3684
                                                          707/707
2019/0362216 A1\* 11/2019 Stokes .................... G16H 50/20
                                                          707/707

OTHER PUBLICATIONS

U.S. Appl. No. 17/378,173, Non-Final Office Action, Mailed on Mar. 22, 2023, 8 pages.
U.S. Appl. No. 17/378,173, Notice of Allowance, Mailed on Sep. 19, 2023, 8 pages.

\* cited by examiner

*Primary Examiner* — Alexandria Y Bromell
(74) *Attorney, Agent, or Firm* — Kilpatrick Townsend & Stockton LLP

(57) ABSTRACT

The present embodiments relate to data processing model recommendation and review of a portion of data using a recommended model. A model catalog executing on a cloud infrastructure (CI) system can parse data from an obtained dataset identifying aspects of the dataset. The parsed data from the dataset can be compared with a plurality of potential models stored in a domain ontology store of the model catalog to identify one or more recommended models. Review output data can be generated using the dataset and any of the recommended models. The review output data resulting from the recommended model can be provided to the client for the client to either accept or reject the model.

20 Claims, 10 Drawing Sheets

MODEL MINING AND RECOMMENDATION ENGINE WITH SIMULATION INTERFACES

CROSS-REFERENCE TO RELATED APPLICATIONS

This application claims the benefit and is a Continuation of application Ser. No. 17/378,173 filed Jul. 16, 2021, entitled "MODEL MINING AND RECOMMENDATION ENGINE WITH SIMULATION INTERFACES", which claims priority to Indian Provisional Patent Application No. 202141023390, filed on May 26, 2021, entitled "MODEL MINING AND RECOMMENDATION ENGINE WITH SIMULATION INTERFACES," the entire contents of which is hereby incorporated by reference for all purposes.

BACKGROUND

In many instances, a client (e.g., a data scientist) may want to have a dataset processed to derive insights into the dataset. As an example, a dataset providing a set of transactions can be processed to derive an output, indicating a likelihood that each transaction in the dataset is fraudulent. As another example, a dataset comprising software code can be processed to output identified error types in the software code. Multiple machine learning models of varying types can be stored/accessible by a model store and used to derive output data.

In many cases, identifying an appropriate model to derive insights into a particular dataset can be difficult and resource intensive. Particularly, when a model store includes a plurality of models including varying model types, a client can analyze many potential models to identify an appropriate model. Reviewing multiple models manually can be time-intensive and resource intensive, as a client may execute a number of models prior to selecting a model to be executed with a particular dataset.

SUMMARY

The present embodiments relate to providing one or more recommended models based on a dataset. A cloud infrastructure system can implement a model catalog that comprises a domain ontology store, storing a plurality of machine learning models that are capable of being executed with respect to an obtained dataset. A first embodiment comprises a method. The method can include obtaining the dataset from a client device and parsing portions of the dataset to derive a set of parsed data identifying features of the dataset. The method can also include comparing the set of parsed data with terms associated with each of a plurality of models stored in a domain ontology store of the model catalog to identify a number of terms for each of the plurality of models that correspond with the set of parsed data for the dataset. The method can also include identifying one or more recommended models of the plurality of models based on the identified number of terms for each of the plurality of models that correspond with the set of parsed data.

The method can also include obtaining a selection of a first recommended model of the one or more recommended models. The method can also include executing a simulation of a portion of the dataset using the first recommended model to output a set of output data providing insights into data resulting from executing the first recommended model using the portion of the dataset. The method can also include providing the set of output data to the client device. The method can also include obtaining a response message specifying an approval or a rejection of the first recommended model from the client device.

Another embodiment relates to a cloud infrastructure system. The cloud infrastructure system can comprise a processor and a non-transitory computer-readable medium. The non-transitory computer-readable medium can include instructions that, when executed by the processor, cause the processor to obtain a dataset from a client device. The instructions can further cause the processor to process the dataset to parse data identifying features of the dataset. The instructions can further cause the processor to compare the parsed data with terms associated with each of a plurality of models in a domain ontology store to identify a number of terms for each of the plurality of models that correspond with the parsed data for the dataset. Each of the plurality of models can be associated with a domain grouping a portion of the plurality of models with a common attribute.

The instructions can further cause the processor to identify one or more recommended models of the plurality of models based on the identified number of terms for each of the plurality of models that correspond with the parsed data. The instructions can further cause the processor to provide the one or more recommended models to the client device. The instructions can further cause the processor to receive a selection of a first recommended model of the one or more recommended models from the client device. The instructions can further cause the processor to execute a simulation of a portion of the dataset using the first recommended model to output a set of output data. This can be performed responsive to receiving the selection of the first recommended model. The instructions can further cause the processor to provide the set of output data to the client device.

Another embodiment relates to a non-transitory computer-readable medium. The non-transitory computer-readable medium includes stored thereon a sequence of instructions which, when executed by a processor causes the processor to execute a process. The process can comprise obtaining the dataset from a client device. The process can also include parsing portions of the dataset to derive a set of parsed data for the dataset. The process can also include comparing the set of parsed data with terms associated with each of a plurality of models stored in a domain ontology store of the model catalog to identify a number of terms for each of the plurality of models that correspond with the set of parsed data for the dataset.

The process can also include identifying one or more recommended models of the plurality of models based on a comparison the set of parsed data with terms associated with each of a plurality of models stored in a domain ontology store of the model catalog identifying a number of terms for each of the plurality of models that correspond with the set of parsed data for the dataset. The process can also include providing the one or more recommended models to the client device. The process can also include obtaining a selection of a first recommended model of the one or more recommended models. The process can also include executing a simulation of a portion of the dataset using the first recommended model to output a set of output data. The process can also include providing the set of output data to the client device.

DETAILED DESCRIPTION

Figure 1:
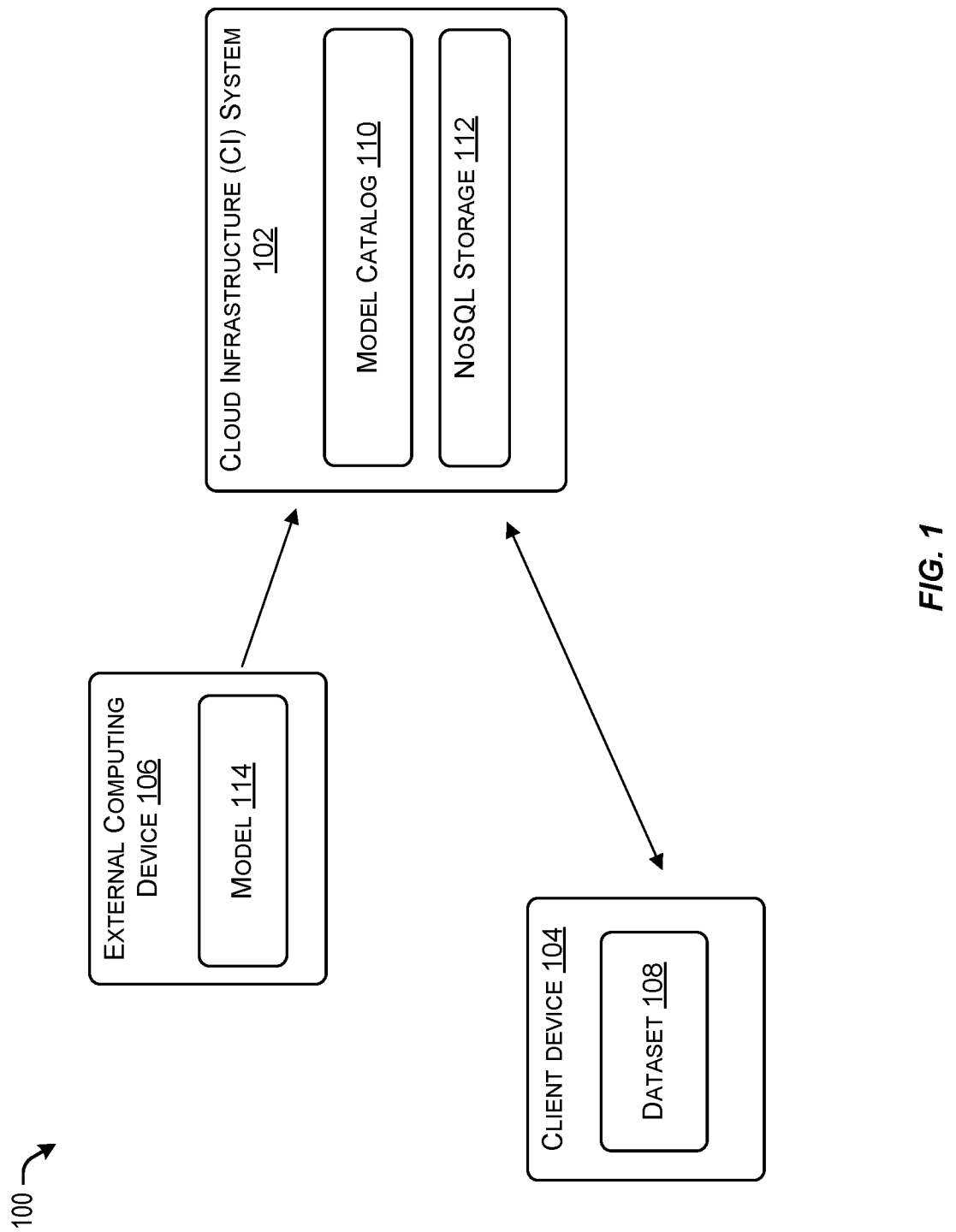
FIG. 1 is a block diagram illustrating an example system for recommending a model based on a received dataset, according to at least one embodiment.

The present embodiments relate to data processing model recommendation and simulation. A model catalog (e.g., a machine learning model catalog) executing on a cloud infrastructure (CI) system can parse data from an obtained dataset (e.g., a spreadsheet containing a plurality of transactions) identifying aspects of the dataset. The parsed data from the dataset can be compared with a plurality of potential models stored in a domain ontology store of the model catalog to identify one or more recommended models. A simulation of any of the recommended models (e.g., responsive to a selection of a recommended model by the client) can be executed using a portion of the dataset to provide insights into output data resulting from executing the recommended model. The output data resulting from the simulation of the recommended model can be provided to the client for the client to either accept (e.g., when the output data is in line with desired output data) or reject (e.g., when the output data is not in line with desired output data) the model.

The model catalog can include a model mining engine where terms defining aspects of the models stored in the domain ontology store are mined from applications accessible to the model catalog. The mining of the classified terms can be performed through a set of correlations based on an ontology of features inferred at the time of data ingestion and data preparation/processing by semantically processing columns or metadata information of existing applications in the cloud infrastructure. The semantic understanding of metadata can be based on a combination of pre-built and continuous learning of ontology from various domains and verticals. Further, existing solution metadata for various domains (e.g., human capital management (HCM), customer relationship management (CRM), enterprise resource planning (ERP), or the like) can further be used to provide terms for models in the model catalog. Further, the ontologies can also be continuously updated in independent processes based on data classification processes (e.g., responsive to receiving new models, by obtaining feedback in selection/rejection of recommended models).

In some instances, the model catalog can also provide model choices with performance evaluation and/or a machine learning (ML) pipeline preview flow inside a data science builder/modeler environment. Further, the model catalog can provide simulations (or what-if scenarios) with multiple recommended models at a data exploration stage and provide recommendations of a most appropriate model for a particular use case scenario.

Accordingly, rather than manually exploring and analyzing all models included in a model catalog, the present model catalog can mine a dataset, recommend a model, and run a simulation of the dataset using the recommended model.

As an illustrative example, a client can provide (e.g., upload) a file (e.g., a spreadsheet) with 15 columns and 10,000 rows to the model catalog. The data can be in a binary format, and a text extraction process can be applied to create a spreadsheet file of the dataset (with a number of rows and columns). The client may want to perform an exploratory analysis and feature engineering to identify relevant models. The model recommendation engine of the model catalog can parse column metadata for the columns to identify terms/keywords from the metadata. For instance, the model recommendation engine can identify the column metadata to be related to a financial domain. The model recommendation engine can further process the column metadata to infer that the dataset relates to credit scores (e.g., by identifying features such as credit history, liabilities, balance history, outstanding payments, credit limits).

A recommendation engine of the model catalog can match the identified information (e.g., terms/keywords) from the metadata with models in the model catalog and identify a number of recommended models (e.g., 5 models). The recommended models can be identified using a model scoring and selection process as described herein. For example, if the model recommendation engine infers that the dataset relates to credit scores, recommended models can relate to a credit fraud detection based on an anomaly model, a credit default prediction based on logistic regression model, a linear regression model for increasing a credit limit, a loan eligibility model for buying a property based on a decision tree, and an offer recommendation model based on collaborative filtering and an xgboost algorithm.

The recommended models can be provided to the client, and the client can select a model (e.g., the credit default prediction based on logistic regression model). Responsive to the selection by the client, a portion of the dataset (e.g., 20% of the dataset) can be run using the selected model in a simulation to generate output data providing insights (e.g., an accuracy, precision of output data, an F1 score) into resultant data from the simulation.

The client can review the output data from the simulation of the recommended model and either accept or reject the model. For example, the client can accept the recommended model and proceed for full model exploration and deployment. Alternatively, if the client is not satisfied with the recommended model, the client can select another recommended model for performance of the simulation.

The model catalog can include a feedback engine that can track feedback as to whether the recommended model was selected or rejected. The feedback engine can feed the feedback into the model catalog to update features of the model catalog, the models, the recommendation engine, etc.

A. System Overview

FIG. 1 is a block diagram illustrating an example system 100 for providing recommended models based on a received dataset. As shown in FIG. 1, the system 100 can include any of a cloud infrastructure (CI) system 102, a client device 104, and an external computing device 106.

The cloud infrastructure (CI) system 102 can include a computing device or series of interconnected computing devices configured to perform processing tasks as described herein. For instance, the CI system 102 can implement a model catalog 110 configured to process a received dataset, recommend a model for the dataset, execute a simulation of the recommended model using a portion of the dataset, and dynamically update a domain ontology store based on whether the recommended model is selected or rejected for the dataset. Data accessible to the model catalog 110 can be stored in one or more storage nodes (e.g., storage 112). The model catalog 110 is discussed in greater detail in FIG. 2.

The client device 104 can include a computing device (e.g., laptop computer, server, mobile phone) that is associated with a client. The client, via client device 104, can provide a dataset 108 to the CI system 102. The dataset 108 can include data from one or more sources, such as a spreadsheet, table, data store, file, etc. For example, the dataset can include multiple rows and columns comprising credit card transactions. In this example, the dataset can be uploaded to the CI system 102 (e.g., via an application programming interface (API)) to identify a recommended model to process the dataset (e.g., to identify a model that can identify fraudulent transactions included in the dataset comprising credit card transactions).

The external computing device 106 can include a computing device associated with a second client, such as a client providing a model to the domain ontology store. For instance, the external computing device 106 can send a model 114 to the domain ontology store of the model catalog 110 to add the model to the domain ontology store.

B. Model Catalog Overview

Figure 2:
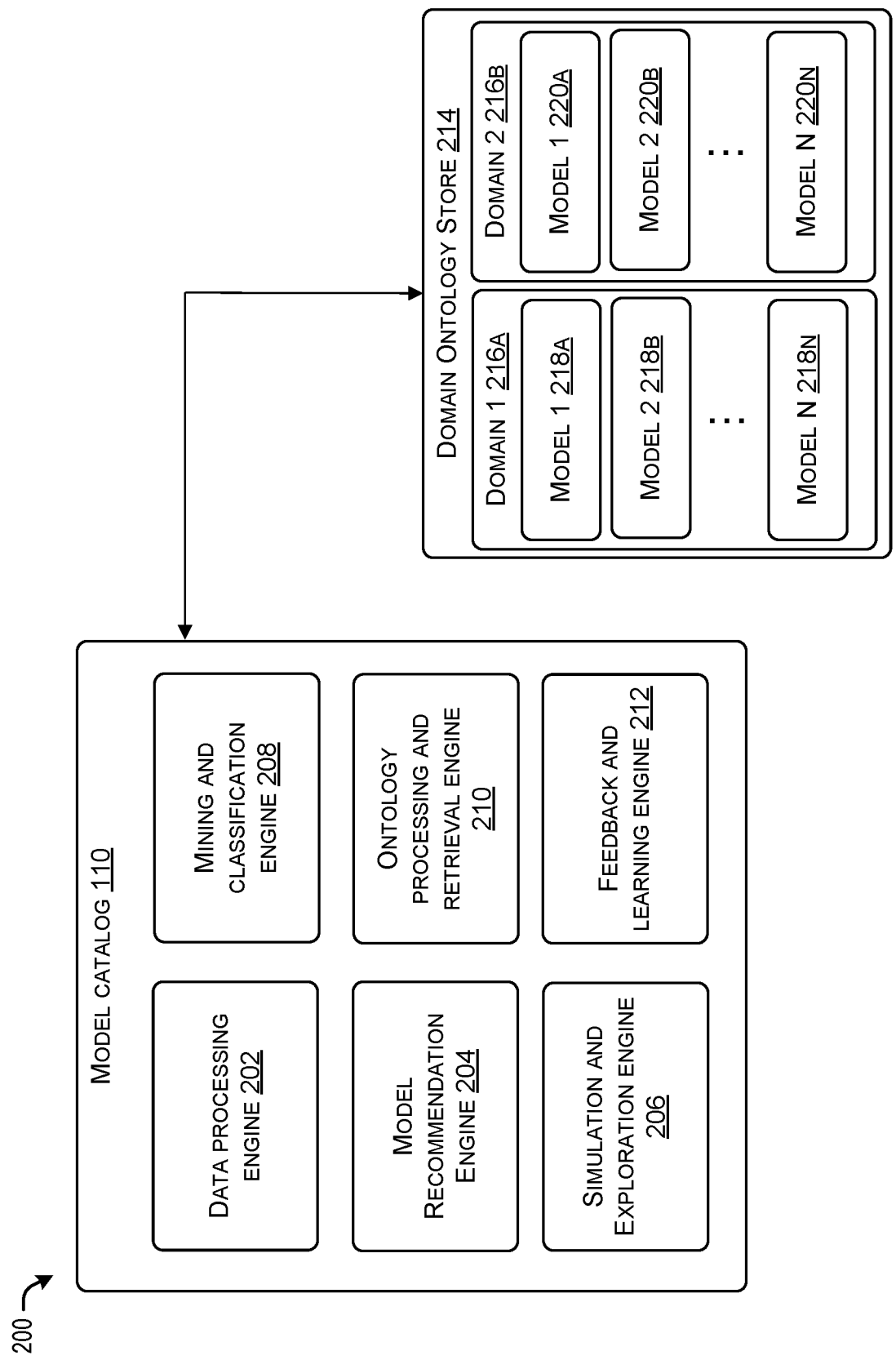
FIG. 2 is a block diagram illustrating an example model catalog, according to at least one embodiment.

FIG. 2 is a block diagram illustrating an example model catalog 110. As shown in FIG. 2, the model catalog 110 can obtain a dataset, process the dataset to identify one or more recommended models for the dataset, execute a simulation using a recommended model, and update a domain ontology store with feedback data resulting from a selection/rejection of the recommended model as described herein. The model catalog 110 can include any of a data processing engine 202, a model recommendation engine 204, a simulation and exploration engine 206, a mining and classification engine 208, an ontology processing and retrieval engine 210, and a feedback and learning engine 212.

The model catalog 110 can also include a domain ontology store 214. The domain ontology store 214 can store a plurality of models, where each model is grouped into a domain. Each domain specifies an attribute or industry common to a number of models. For instance, domain 1 216*a* includes models 218*a-n* relating to HCM, while domain 2 216*b* includes models 220*a-n* relating to CRM.

The data processing engine 202 can ingest a dataset (e.g., dataset 108 provided by client device 104) and process the dataset to parse data from the dataset. The parsed data can be utilized in identifying one or more recommended models corresponding to the dataset. The dataset can be of various types, such as a spreadsheet, data store, file, table, etc., and can include any of a structured, unstructured, semi semi-structured, or binary data type.

In some instances, the data processing engine 202 can convert the dataset into a format/type capable of being processed by the data processing engine 202. For example, a binary dataset can be converted into a spreadsheet file comprising a number of rows and columns comprising text, numbers, etc.

The data processing engine 202 can process the dataset to parse data from the dataset. The data processing engine 202 can parse column data and metadata from the dataset to identify headings, variables, terms, etc., indicative of data types included in the dataset. For instance, for a dataset including a number of credit card transactions, the parsed data can include terms relating to a transaction time, transaction location, transaction amount, an account number, etc. In some embodiments, the data processing engine 202 can include a store of associated terms. For example, the store of associated terms can associate a term "liab" with the term "liabilities."

The data processing engine 202 can include one or more text parsers to extract text from the dataset. Further, the data processing engine 202 can extract semantic information through Named Entity Recognition (NER) or a similar technique. Based on the extracted entities, the system can apply contextual information, such as relevant domain and applications, through the ontology store listed in the next section.

The model recommendation engine 204 can compare parsed data from the dataset with information relating to a plurality of models in a domain ontology store to identify one or more recommended models. For instance, the model recommendation engine 204 can identify a number of similar terms between the parsed data and terms associated with each model.

For example, a dataset relating to loan applications can include parsed terms of "assets," "liabilities," "income," etc. In this example, the parsed terms can be compared with data in the domain ontology store to identify a first model with classified terms "income," and "liabilities," that are common with the parsed data of the dataset. In some instances, a number of common terms can be indicative of a relevance of each model to the dataset. Other features of the models, such as a popularity or usage of each model, a client that created/provided the model, features specific to the model, etc., can be used to determine a relevance of each model to the dataset. In some embodiments, the model recommendation engine 204 can process the parsed data to return a set of possible association terms using cosine similarity or a technique such as word vectors.

In some instances, the model recommendation engine 204 can generate a confidence metric for each model. The confidence metric can include a value (a percentage from a range of values) indicative of an estimated likelihood that the model is relevant to the dataset. The confidence value can be based on a number of common terms between each model and the parsed data from the dataset.

The model recommendation engine 204 can identify one or more recommended models specific to the dataset. For example, a listing of recommended models and a description of each recommended model can be provided to the client device for selection of a recommended model. The client device can select a first model of the listing of recommended models to execute the first model using a portion of the dataset. In some embodiments, a recommended model with a greatest number of common terms to the parsed data or a highest confidence value can be automatically selected as a recommended model.

The simulation and exploration engine 206 can execute a simulated or partial execution of the dataset using a selected recommended model. For example, the simulated execution can include executing the recommended model using a portion of the dataset. The simulated execution of the model can provide output data that can provide insights into a type of data resulting from execution of the model using the dataset.

For instance, if a model determining whether credit card transactions are fraudulent runs a portion of a dataset comprising credit card transactions, the output data can specify a number of transactions that are fraudulent and an estimated likelihood that the transaction was fraudulent. Such output data can be relevant to the dataset, and the client can select the model for execution of the entire dataset. As another example, if a model determining whether loan applications are fraudulent runs a portion of a dataset comprising credit card transactions, the output data may be unintelligible, as the data output from the model (e.g., whether a loan application is fraudulent) is not relevant to a credit card transaction. Accordingly, in this example, the output data can be reviewed by the client as irrelevant to the desired output, and the client can reject the model and request a new recommended model.

The model catalog 110 can generate the domain ontology store and can continuously add new models to the domain ontology store. The mining and classification engine 208 can mine data from existing applications and classify associated terms that can be used to classify models in the domain ontology store. Data can be mined from existing datasets in other existing applications to classify terms that can be used to identify features of models stored in the domain ontology store. In some embodiments, the mining and classification engine 208 can extract and remove any private or customer-specific data.

The mining and classification engine 208 can perform an entity recognition (e.g., NER) process to classify terms extracted from other datasets. For example, extracted terms "assets," "liabilities," "income, "credit score," etc. can be associated as financial terms and terms relating to credit decisions, loan applications, etc. The association of terms can provide commonly-associated terms that can apply to various models used to identify a relevance of a model to a received dataset.

The extracted terms can be organized in a NoSQL store based on various features. Example features includes a domain for the terms, an application type originating the terms, column names, a feature identified using named entity recognition, other potential associated terms, a usage history of features, learning information (e.g., errors or mismatches), etc.

The ontology processing and retrieval engine 210 can generate a domain ontology store and add new models (and data corresponding to the models) to the domain ontology store. For example, responsive to a new model being received, the terms relating to the model can be identified and the model can be classified according to the identified terms. The model can be stored in NoSQL storage as associated with the domain and the terms classifying the model.

The feedback and learning engine 212 can obtain feedback data from the recommendation of a model and subsequent selection/rejection of the model for a specific dataset. The feedback data can be generated from parsed data from the dataset, terms of the recommended model corresponding to parsed data from the dataset, output data resulting from the simulated execution of the model using a portion of the dataset, and whether the model was accepted or rejected.

For example, if the dataset relates to credit card transactions (e.g., a transaction date, transaction location, transaction amount, account number) and the recommended model is a model detecting fraudulent loan applications, the output data may be irrelevant to the dataset (e.g., outputting unintelligible data). In this example, the client may reject the model, and the feedback data can be fed into the domain ontology store to specify that similar datasets are not relevant to the model. For example, the feedback data can indicate that the parsed terms from the dataset are not associated with the model.

The learning of named entities can be continuous based on the domain and application type, as clients can provide feedback by selecting/recommending the recommended model. If the client rejects the recommended model, the feedback and learning engine 212 can measure the mismatches or errors to update the domain ontology store as an online learning process. The feedback and learning engine 212 can use Recurrent Neural Networks, Hidden Markov Models, Conditional Markov Models, Naïve Bayes Classifiers, reinforcement learning, etc., in dynamically updating the domain ontology store.

C. Model Recommendation and Simulation

Figure 3:
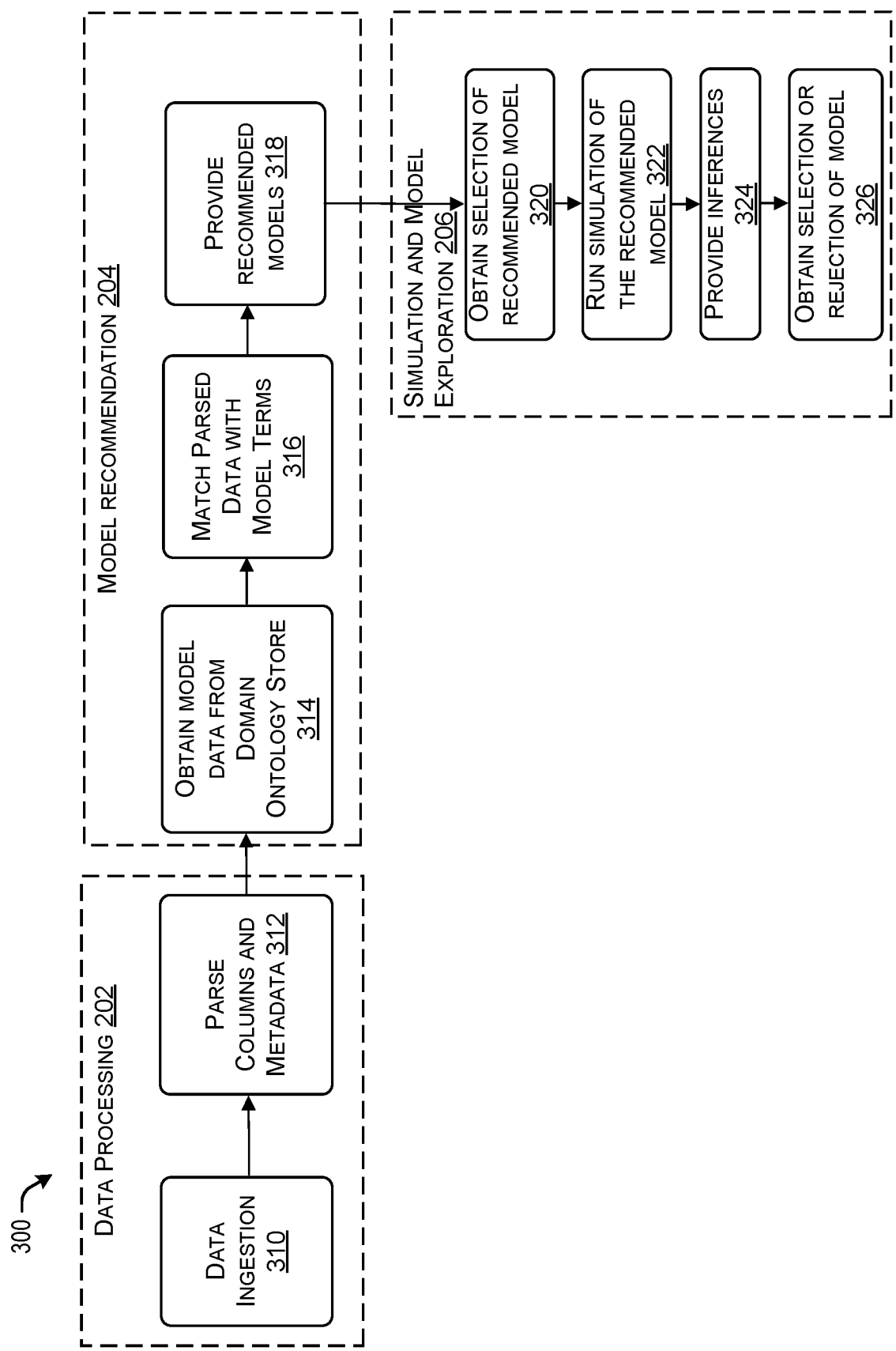
FIG. 3 is a block diagram illustrating a model recommendation and simulation process, according to at least one embodiment.

FIG. 3 is a block diagram 300 illustrating a model recommendation and simulation process. As shown in FIG. 3, the system as described herein can perform tasks relating to the data processing engine 202, model recommendation engine 204, and the simulation and exploration engine 206 as discussed with respect to FIG. 2. The data processing engine 202 can ingest and process obtained datasets. The model recommendation engine 204 can identify one or more recommended models specific to the dataset. The simulation and exploration engine 206 can run a simulation to provide output data that can be provided to a client for approval or rejection of the recommended model.

At block 310, the dataset can be ingested. A client (via a client device) can upload a dataset to the model catalog. The dataset can comprise different sources, such as spreadsheets, data stores, files, etc. For example, the dataset can include a plurality of rows and columns specifying a plurality of transactions (e.g., data relating to credit card transactions). The dataset can be structured, unstructured, semi semi-structured, binary, etc.

At block 312, column data and metadata can be parsed from the dataset. The column data and/or the metadata can specify various features relating to the data. The column data and metadata can provide names, headings, data types, etc., that can be indicative of the type(s) of data included in the dataset. For example, for a dataset relating to credit transactions, column names can relate to credit scores, assets, income, liabilities, etc. The system can extract semantic information through Named Entity Recognition (NER) or similar approaches. Based on the extracted entities, contextual information such as relevant domain and applications through the ontology store can be identified.

At block 314, as part of the model recommendation process 304, model data from the domain ontology store can be obtained. The domain ontology store included in a model catalog can include a plurality of models of varying types. Models can be grouped into domains specifying groups of models separated by model type. Example domains include a financial domain, a telecom domain, a CRM domain, an HCM domain, an ERP domain, etc. For example, models in a financial domain can include a model relating to fraud detection in credit cards, multiple models relating to fraud detection in loan applications using varying techniques, a model for approval of mortgages, etc. Clients can provide new models to the domain ontology store that can be subsequently classified and provided as recommended models for specific datasets.

Each model can be associated with a plurality of keywords or terms identifying aspects of each model. For example, a model relating to fraud detection in credit cards can include terms relating to credit cards, fraud detection, liabilities, assets, credit scores, etc. In some instances, terms can be extracted from the model or the terms can be provided by the client and associated with the model in the domain ontology store. The model catalog can perform a look up of the domain ontology store to return a set of association terms using cosine similarity or techniques such as word vectors.

At block 316, parsed data from the dataset can be compared with terms or parameters associated with each model to identify one or more recommended models. This can include identifying a domain associated with the parsed data from the dataset to identify one or more recommended domains and further comparing the parsed data with terms/keywords from models included in the recommended domain(s) to identify one or more recommended models.

The model recommendation engine 204 can perform keyword matching to identify a number of similar features between the dataset and each model in a domain. As an example, a dataset relating to detecting fraud in credit card transactions can be compared with a series of domains to identify that terms relating to the dataset (e.g., transaction, credit, asset, liability, transaction amount, etc.) has terms that correspond with a financial domain over other domain types. The model catalog can also compare the parsed data from the dataset with terms associated with models in the domain.

The model catalog can identify a number of common terms/keywords between the parsed dataset and terms associated with each model. In some instances, recommended models can include a number of models (e.g., 3 models, 5 models) that have a greatest number of similar terms to the parsed data from the dataset.

In some embodiments, each model can be associated with a confidence metric. Each confidence metric can be indicative of a derived relevance of the model to the dataset. For instance, the number of common terms/keywords between the parsed dataset and terms associated with a model, a domain context associated with the model, a popularity of the model, a source of the model, etc., can be combined to generate a confidence metric. The confidence metric for each model can be used to select recommended models (e.g., as models with a highest confidence value).

At block 318, the recommended models can be provided to the client. For example, five recommended models can be provided to a client device for selection of a model by a client. The listing of the recommended models can include a description of each recommended model, a number of terms of each recommended model that corresponds to parsed data from the dataset, a confidence value, etc.

At block 320, a selection of a recommended model can be obtained by a simulation and model exploration engine 206 of the model catalog. For instance, a client can select a first recommended model for simulation and provide the selection to the model catalog. As another example, the model catalog can automatically select a recommended model based on a parameter (e.g., a greatest number of common terms with the parsed data of the dataset, a greatest confidence value).

At block 322, a simulation of the selected recommended model can be executed using a portion of the dataset. For instance, a portion (e.g., 30%) of the dataset can be provided as an input to execute the selected recommended model. The simulated execution of the selected recommended model can output data providing insights into an accuracy, relevance, output data type, etc., resulting from the execution of the model. For example, if a portion of a dataset relating to credit card transactions is ran through a credit card fraud detection model, the output data can specify transactions that are most likely to be fraudulent, which can be relevant to the client. In another example, if a portion of a dataset relating to credit card transactions is ran through a mortgage application fraud model, the output data may include irrelevant or unintelligible output data, which may not be relevant to the client.

At block 324, inferences from the output data of the simulation can be provided to the client. For instance, the output data and inferences included in the output data (e.g., an accuracy, F1 score, output data types) can be provided to the client device for review by the client.

At block 326, the simulation and model exploration engine 206 can obtain an approval or rejection of the selected recommended model. The approval or rejection can be provided by the client via a client device. For example, responsive to obtaining an approval from the client, a further action (e.g., providing more information relating to the model, executing the recommended model using the entire dataset) can be performed. As another example, if the client rejects the recommended model, the simulation process described above can be performed for another recommended model. For instance, the listing of recommended models can be provided to the client device and a second recommended model can be selected. The approval or rejection of a recommended model can be provided as feedback data to be fed back into the model catalog, which is described in greater detail in FIG. 4 below.

D. Domain Ontology Store Creation and Updating

Figure 4:
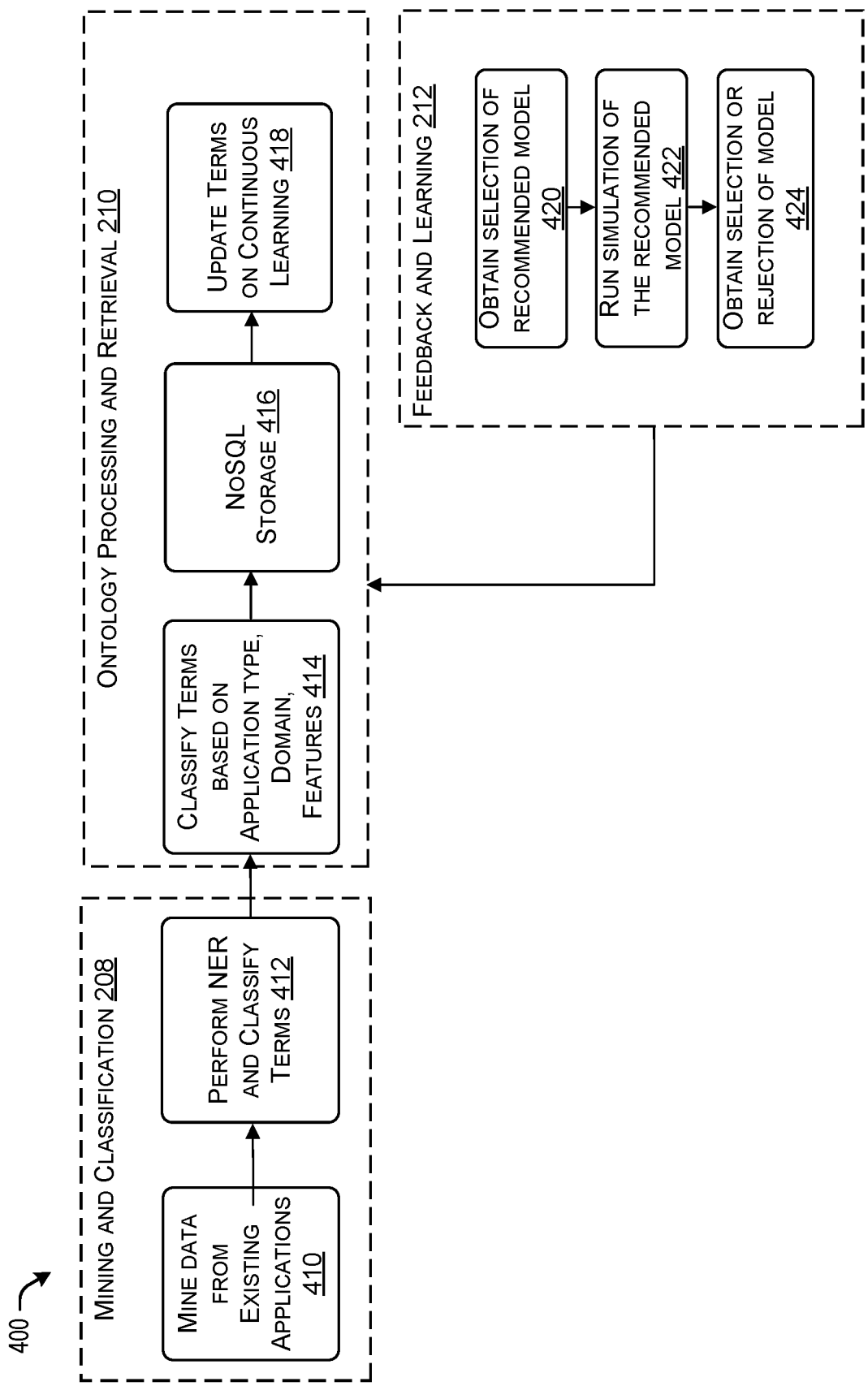
FIG. 4 is a flow diagram of a process for creating and updating a domain ontology store, according to at least one embodiment.

FIG. 4 is a flow diagram 400 of a process for creating and updating a domain ontology store. For example, the model catalog can include a mining and classification engine 208, an ontology processing and retrieval engine 210, and a feedback and learning engine 212. The mining and classification engine 208 can mine data and classify terms for use in the domain ontology store. The ontology processing and retrieval engine 210 can add models to a domain ontology store and update terms based on feedback data. The feedback and learning engine 212 can continuously obtain feedback from recommended models and update the domain ontology store using the feedback data.

At block 410, the mining and classification engine 402 can mine data from existing applications. For example, datasets existing in CRM applications, ERP applications, HCM applications, etc., accessible to the CI system can be mined to identify terms, header data, etc., identifying features specific to each domain. In some embodiments, terms from an external data store can be obtained and used for term classification.

At block 412, the obtained terms can be classified. Classification of the terms can be performed using an entity recognition technique, such as NER, for example. Terms can be classified as associated with one or more domains or industries. For example, a term "liability" can be classified as associated with a financial domain. Further, classified terms can be associated with other terms common to a domain/industry. For example, the term "liability" can relate to commonly-associated financial terms such as "asset," "credit," "loan," etc. As another example, the term "lead" can be associated with associated CRM terms such as "opportunity," "sale," "client contact information," etc.

At block 414, the ontology processing and retrieval engine 210 can classify terms for the domain ontology store.

This can include classifying terms for domains included in the domain ontology store or classifying terms for models in the domain ontology store, for example. The classifications of terms can be based on an application type, a domain, features of the domain/model, etc.

For example, each model in the domain ontology store can be processed to identify terms associated with the model and classify the identified terms. For instance, a model can be processed to identify headers, variables, input parameters, output parameters, data formats of the mode, etc., to extract terms relating to the model. As an example, a model to identify fraudulent credit card transactions can be processed to identify terms relating to input data elements (a transaction amount, transaction location, a transaction time), input data elements (e.g., whether the transaction was fraudulent), data formats (e.g., dollar amounts, credit card numbers), etc. The extracted terms can be classified by domain (e.g., a financial domain) and associated with related terms. The extracted terms for a model can be compared with parsed data from a dataset (e.g., as discussed at block 316) to determine whether the model is recommended for the dataset (e.g., as discussed at block 318).

The classification of terms can associate terms with a domain and/or each model associated with domains in the domain ontology store. The associated terms can build out the domain ontology store to allow for comparing a dataset with domains/models in the domain ontology store and recommending models for the dataset.

At block 416, data relating to the domain ontology store can be stored at a storage node (e.g., a NoSQL storage). For instance, model data (e.g., code to execute a model, terms associated with a model) can be stored in NoSQL storage as being associated with a domain. Data stored at the NoSQL storage node can be retrieved and utilized to recommend a model and perform a simulated execution of the dataset using a recommended model as described above.

At block 418, the ontology processing and retrieval engine 210 can update terms in the domain ontology store using a continuous learning process. Feedback data relating to selection or rejection of a recommended model can be obtained and used to continuously update data relating to models and domains in the domain ontology store.

As an example, feedback data can include terms common between the parsed data of the dataset and the recommended model, and an indication that the model was selected for the dataset. In this example, the feedback data can specify that the model is relevant to datasets including features similar to those specified in the parsed data for the dataset.

At block 420, the feedback and learning engine 212 can obtain a selection of a recommended model. The feedback and learning engine 212 can add the parsed data for the dataset and terms common between the dataset and the recommended model to the feedback data.

At block 422, the feedback and learning engine 212 can run a simulation of the recommended model. The output data resulting from running the simulation using a portion of the dataset can be provided as part of the feedback data. For instance, if the output data is relevant to the dataset, the output data can be used to indicate other dataset types that are relevant to the model.

At block 424, the feedback and learning engine 212 can obtain a selection or rejection of the model. The selection or rejection of the recommended model can be indicative of whether the model is relevant to the dataset. The selection/rejection of the model can be used in combination with other dataset or model data as feedback data to update the domain ontology store.

Figure 5:
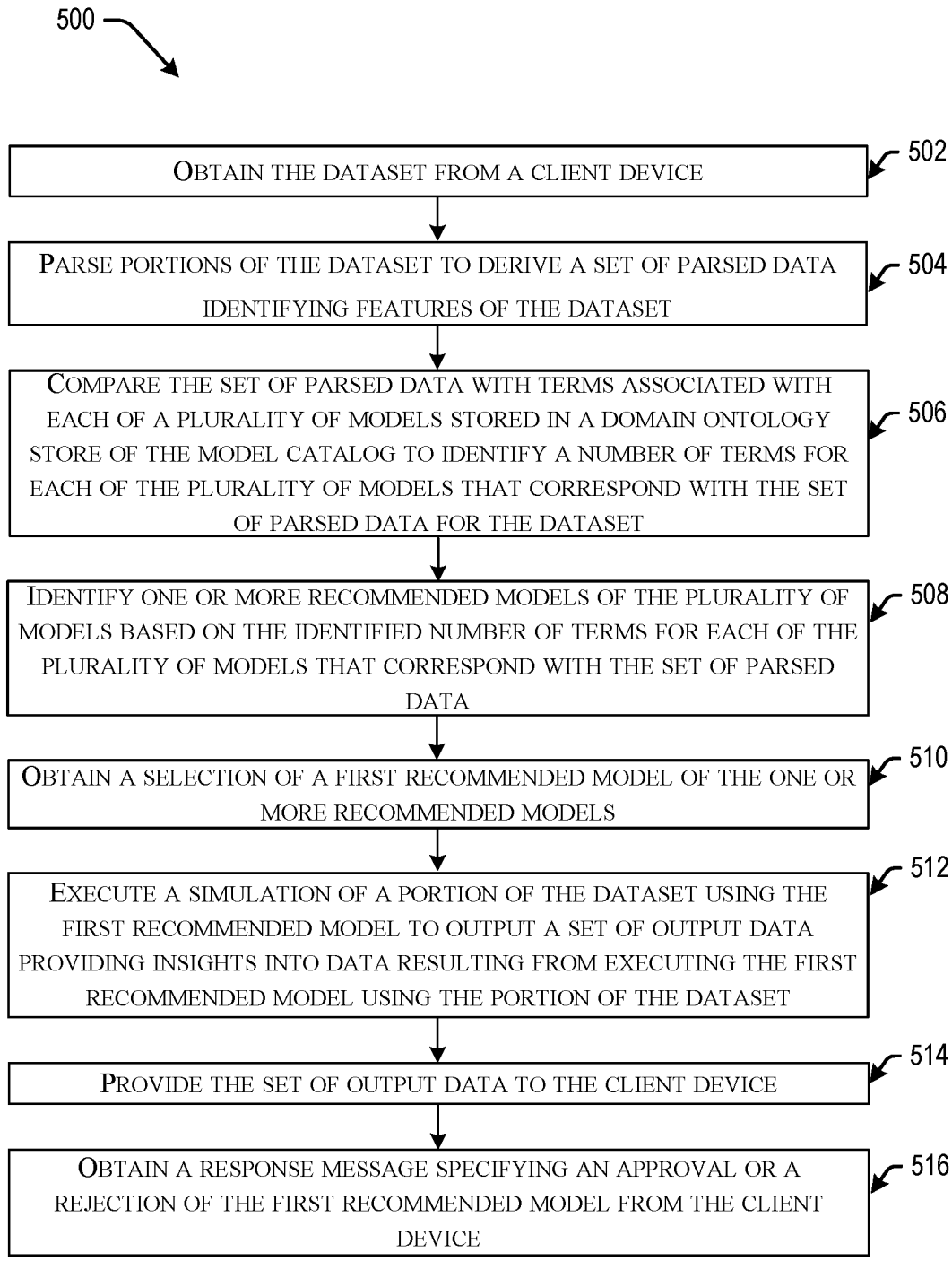
FIG. 5 is a block diagram of an example method for providing one or more recommended models based on a dataset, according to at least one embodiment.

E. Example Method for Providing One or More Recommended Models Based on a Dataset FIG. 5 is a block diagram 500 of an example method for providing one or more recommended models based on a dataset. The method can be performed by a model catalog 110 executing on a cloud infrastructure system 102 as described with respect to FIG. 1, for example.

At block 502, the method can include obtaining the dataset from a client device. The dataset can comprise a table, spreadsheet, etc., comprising data to be processed using a model. As an example, the dataset can include a spreadsheet comprising a plurality of credit card transactions. The client may provide the dataset to have the dataset processed using a model to obtain resultant output data. For example, the client may want the spreadsheet including the plurality of credit card transactions processed to identify potentially fraudulent transactions and an estimated likelihood of each transaction being fraudulent.

At block 504, the method can include parsing portions of the dataset to derive a set of parsed data identifying features of the dataset. For example, the model catalog can process the dataset including the plurality of transactions to identify a series of columns with headings (e.g., transaction time, transaction location, transaction amount, account number) of the dataset. The headings or other metadata can be parsed from the dataset, as such data can be indicative of the nature of the dataset or types of data included in the dataset.

At block 506, the method can include comparing the set of parsed data with terms associated with each of a plurality of models stored in a domain ontology store of the model catalog to identify a number of terms for each of the plurality of models that correspond with the set of parsed data for the dataset.

Each model in the domain ontology store can be associated with a domain and include one or more terms classifying the model. For example, a credit card transaction fraud detection model can be in a financial domain and include terms relating to "credit," "fraud," "transaction," etc., to identify a nature of the model. The terms can be compared with parsed data from the dataset to identify any terms common between the dataset and model.

At block 508, the method can include identifying one or more recommended models of the plurality of models based on the identified number of terms for each of the plurality of models that correspond with the set of parsed data.

As an illustrative example, a dataset with parsed data including parsed column data including "credit," "transaction date," and "transaction amount" can be compared with a first model relating to credit card fraud detection that includes the terms "credit," transaction date," "transaction amount," and "fraud," and a second model relating to loan application fraud detection that includes the terms "loan," "liabilities," "assets," "credit," and "fraud." In this example, comparing the parsed data with the first model can identify three common terms ("credit," transaction date," "transaction amount"), while comparing the parsed data with the second model can identify only one common term ("credit"). In this example, the first model can be identified a recommended model based on the number of common terms (three) exceeding the number of common terms to another model (e.g., one common term with respect to the second model).

In some embodiments, identifying the one or more recommended models of the plurality of models includes identifying models with a greatest number of terms that correspond with the set of parsed data for the dataset. In other embodiments, identifying the one or more recommended models of the plurality of models includes deriving a confidence metric for each model based on a combination of a number of terms that correspond with the set of parsed data for the dataset, any context data for a domain associated with each model, and a usage of each model, the confidence metric indicative of an estimated relevance of each model to the dataset.

In some embodiments, identifying the one or more recommended models of the plurality of models can include determining a first domain of a plurality of domains that includes a greatest number of features that correspond with the set of parsed data for the dataset. For example, the parsed data can be compared with terms associated with the domains included in the domain ontology store to first identify a domain relevant to the dataset. The method can then identify one or more recommended models of the grouping of associated models associated with the first domain based on the identified number of terms for each of the grouping of associated models that correspond with the set of parsed data.

At block 510, the method can include obtaining a selection of a first recommended model of the one or more recommended models. For example, a listing of recommended models can be provided to the client device, and the client, via client device, can provide a selection of a first recommended model to perform a simulated execution of the model using a portion of the dataset.

At block 512, the method can include executing a simulation of a portion of the dataset using the first recommended model to output a set of output data providing insights into data resulting from executing the first recommended model using the portion of the dataset. For example, a portion of the dataset (e.g., 20%) can be provided as an input to the first recommended model to obtain output data resulting from execution of the model.

At block 514, the method can include providing the set of output data to the client device. The output data can provide insights as to whether the model provides relevant output data specific for the dataset. The client, via client device, can review the output data and provide an indication of whether the output data is relevant to a requested processing task to be performed to the dataset.

At block 516, the method can include obtaining a response message specifying an approval or a rejection of the first recommended model from the client device. Based on the selection/rejection of the model, an action can be performed.

For example, responsive to determining that the response message indicates the approval of the first recommended model, the first recommended model can be executed using information from the dataset. As another example, responsive to determining that the response message indicates the rejection of the first recommended model, an updated listing of the one or more recommended models without the first recommended model can be provided to the client device and a selection of a second recommended model of the one or more recommended models provided in the updated listing can be received. The system can execute a second simulation of the portion of the dataset using the second recommended model to output a second set of output data and the system can provide the second set of output data to the client device to be accepted/rejected by the client.

In some embodiments, any of the identified number of terms for the first recommended model that correspond with the set of parsed data for the dataset, the set of output data, and whether the response message indicates that the first recommended model is accepted or rejected is fed into the model catalog as feedback data. The feedback data can be used to update the domain ontology store of the model catalog.

F. IaaS Overview

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
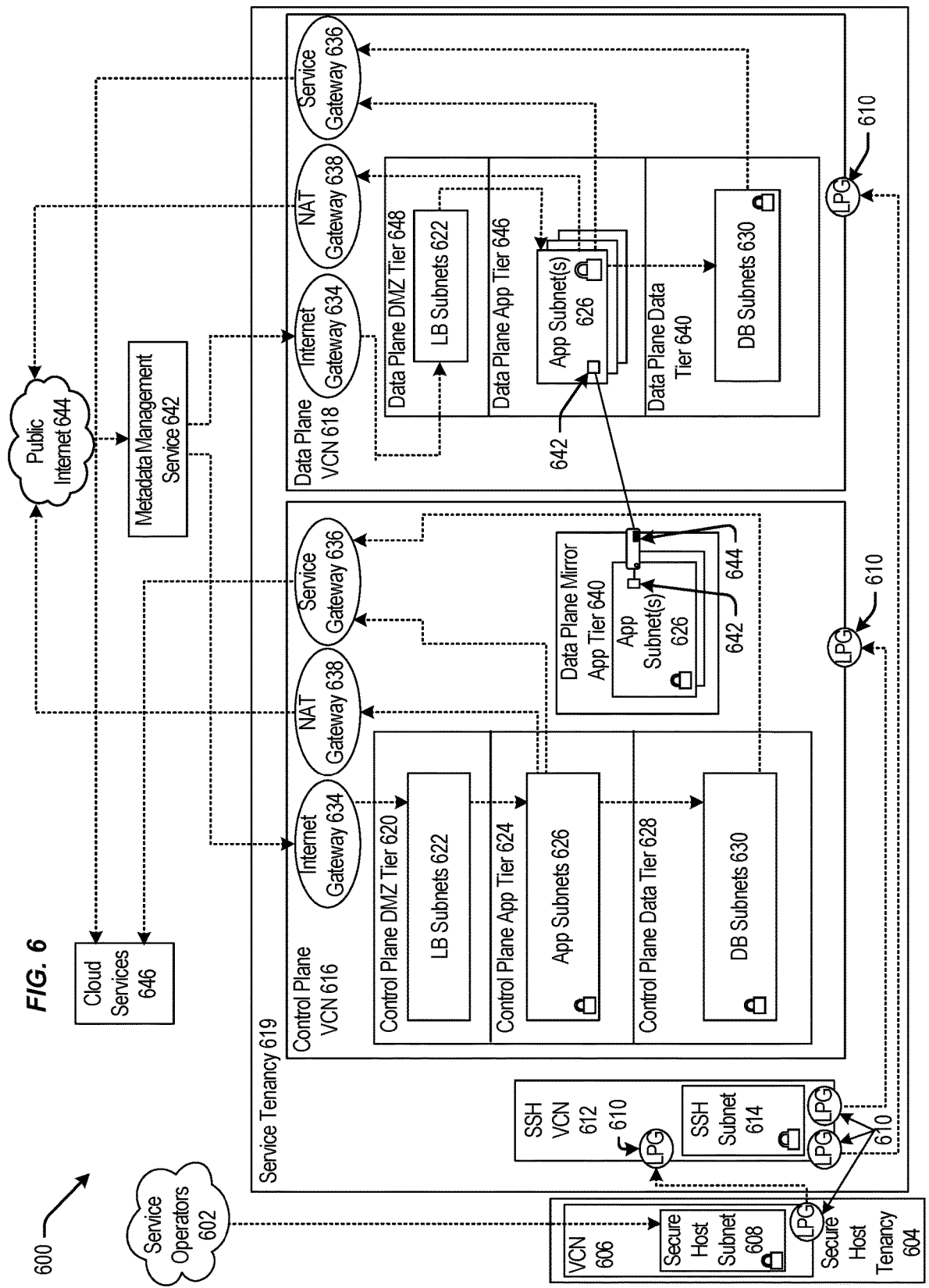
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
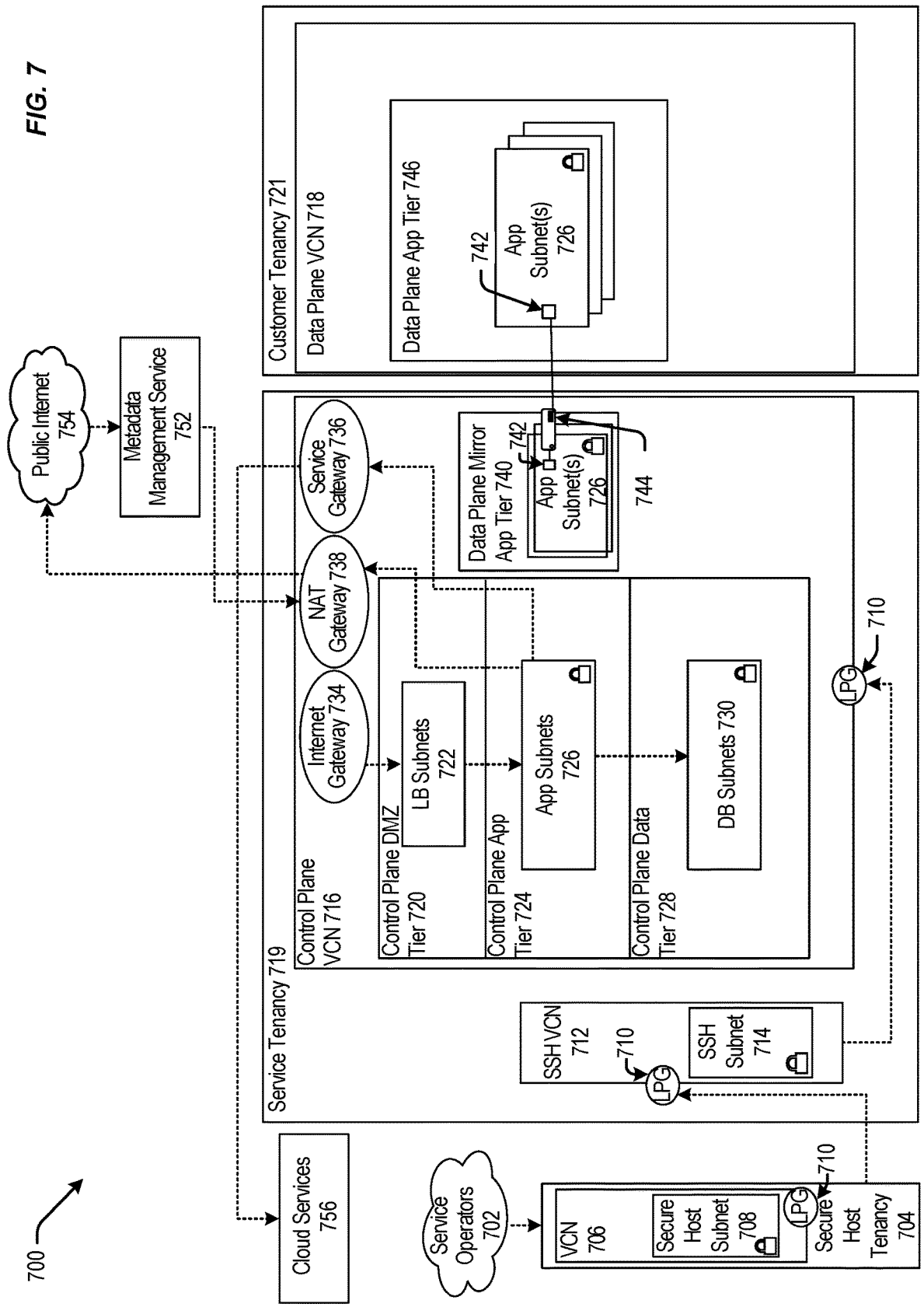
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 4." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 4.

Figure 8:
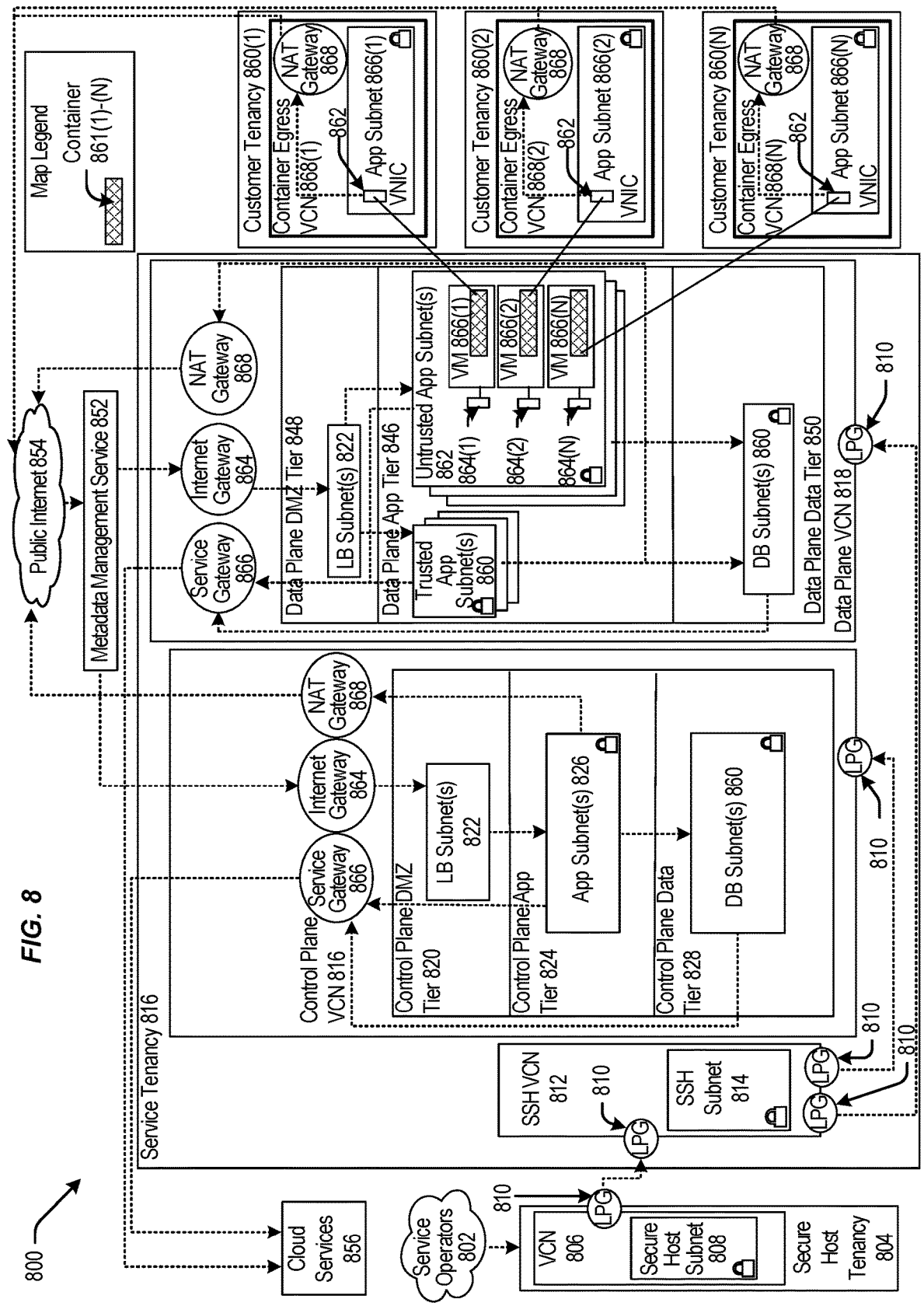
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
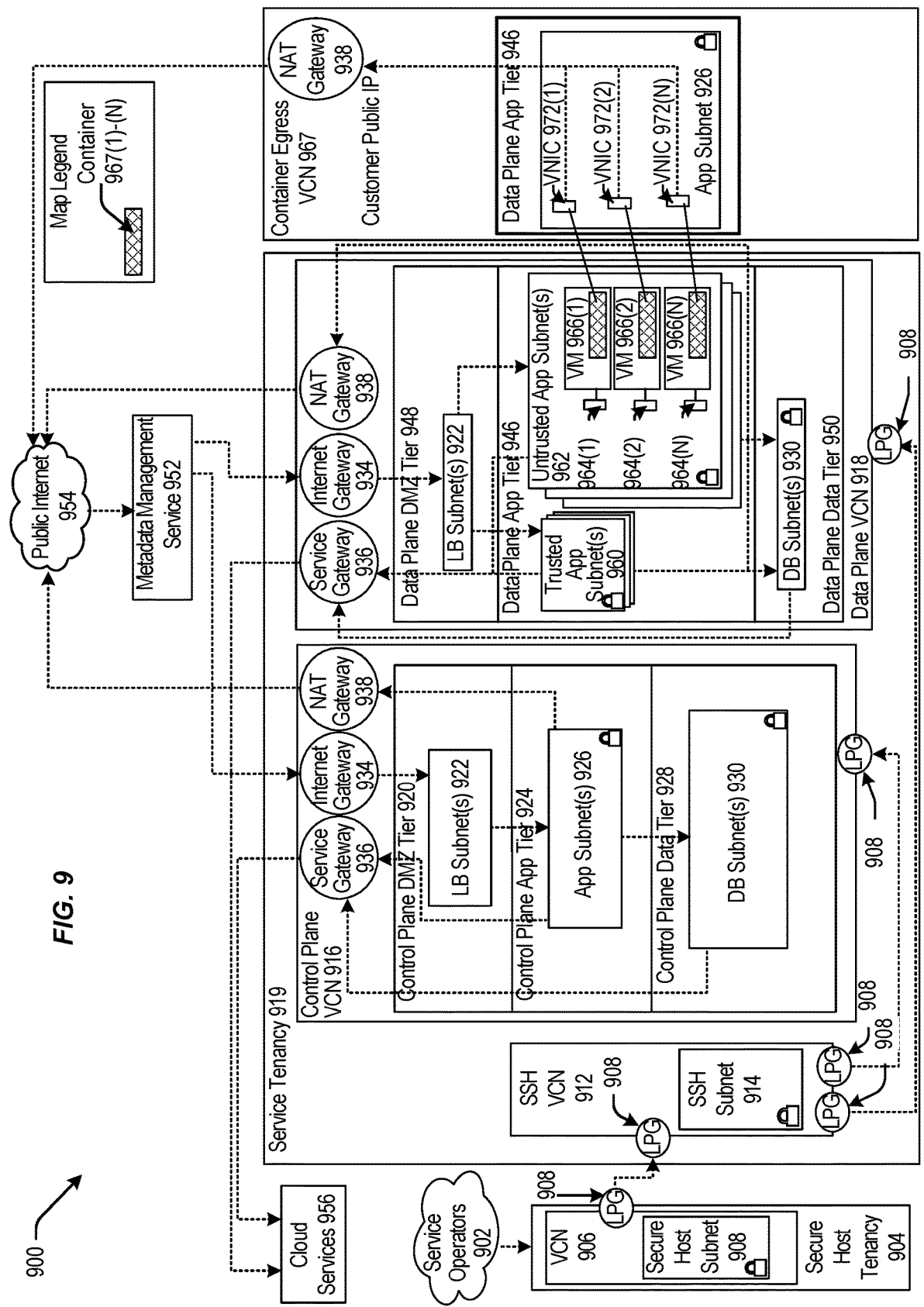
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
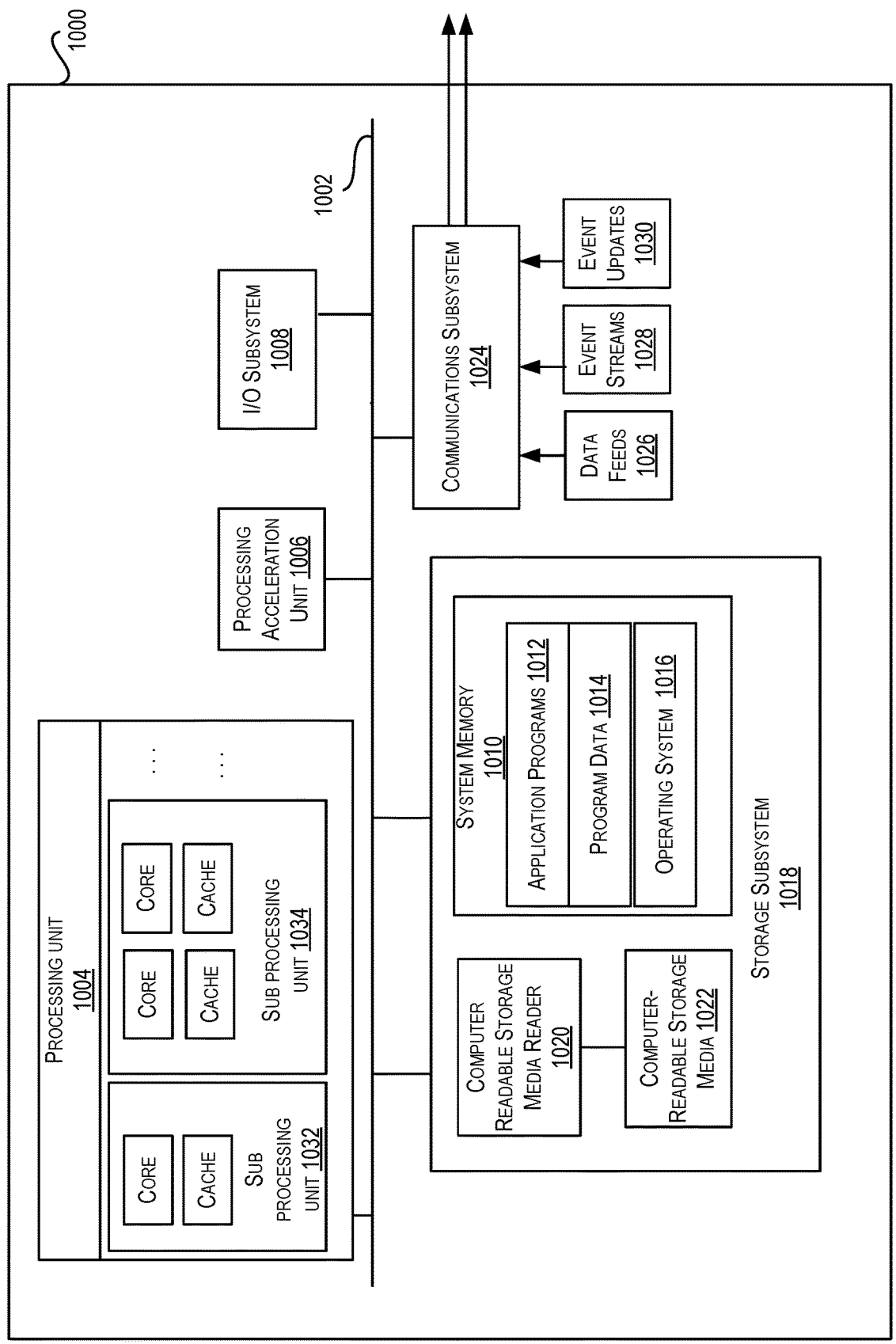
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018, and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 460 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 4D scanners, 4D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 4G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method performed by a model catalog of a cloud infrastructure system to provide one or more recommended models based at least in part on a dataset, the method comprising:
    obtaining the dataset from a client device;
    parsing portions of the dataset to derive a set of parsed data identifying features of the dataset;
    comparing the set of parsed data with terms associated with each of a plurality of models stored in a domain ontology store of the model catalog to identify a number of terms for each of the plurality of models that correspond with the set of parsed data for the dataset;
    identifying one or more recommended models of the plurality of models based at least in part on the identified number of terms for each of the plurality of models that correspond with the set of parsed data;
    obtaining a selection of a first recommended model of the one or more recommended models;
    generating review output data based at least in part on a portion of the dataset and the first recommended model;
    providing the review output data to the client device; and
    obtaining a response message specifying an approval or a rejection of the first recommended model from the client device, and
    wherein the identified number of terms for the first recommended model that correspond with the set of parsed data for the dataset, the review output data, and whether the response message indicates that the first recommended model is accepted or rejected is fed into the model catalog as feedback data, wherein the feedback data is used to update the domain ontology store of the model catalog.

2. The method of claim 1, wherein identifying the one or more recommended models of the plurality of models comprises identifying models with a greatest number of terms that correspond with the set of parsed data for the dataset.

3. The method of claim 1, further comprising:
    deriving, for each of the plurality of models, a confidence metric based at least in part on a combination of a number of terms that correspond with the set of parsed data for the dataset, context data for a domain associated with each model, and a usage of each model, the confidence metric indicative of an estimated relevance of each model to the dataset.

4. The method of claim 1, wherein identifying the one or more recommended models of the plurality of models further comprises:
    determining a first domain of a plurality of domains that includes a greatest number of features that correspond with the set of parsed data for the dataset, wherein each of the plurality of domains correspond with a grouping of associated models; and
    identifying one or more recommended models of the grouping of associated models associated with the first domain based at least in part on the identified number of terms for each of the grouping of associated models that correspond with the set of parsed data.

5. The method of claim 1, wherein parsing portions of the dataset to derive the set of parsed data further comprises:
    parsing column data from spreadsheet or table columns included in the dataset; and
    deriving metadata of the dataset, wherein the column data and the metadata comprise the set of parsed data that indicate the identified features of the dataset.

6. The method of claim 1, further comprising:
    responsive to determining that the response message indicates the approval of the first recommended model, executing the first recommended model using information from the dataset.

7. The method of claim 1, wherein responsive to determining that the response message indicates the rejection of the first recommended model, the method further comprises:
    providing an updated listing of the one or more recommended models without the first recommended model to the client device;
    obtaining a selection of a second recommended model of the one or more recommended models provided in the updated listing;
    generating second review output data based at least in part on the portion of the dataset and the second recommended model; and
    providing the second review output data to the client device.

8. A cloud infrastructure system comprising:
    a processor; and
    a non-transitory computer-readable medium including instructions that, when executed by the processor, cause the processor to:

obtain a dataset from a client device;
parse portions of the dataset to derive a set of parsed data identifying features of the dataset;
compare the set of parsed data with terms associated with each of a plurality of models stored in a domain ontology store of a model catalog to identify a number of terms for each of the plurality of models that correspond with the set of parsed data for the dataset;
identify one or more recommended models of the plurality of models based at least in part on the identified number of terms for each of the plurality of models that correspond with the set of parsed data;
provide the one or more recommended models to the client device;
obtain a selection of a first recommended model of the one or more recommended models;
responsive to receiving the selection of the first recommended model, generate review output data based at least in part on a portion of the dataset and the first recommended model;
provide the review output data to the client device; and
obtain a response message specifying an approval or a rejection of the first recommended model from the client device, and
wherein the identified number of terms for the first recommended model that correspond with the set of parsed data for the dataset, the review output data, and whether the response message indicates that the first recommended model is accepted or rejected is fed into the model catalog as feedback data, wherein the feedback data is used to update the domain ontology store of the model catalog.

9. The cloud infrastructure system of claim 8, wherein the non-transitory computer-readable medium further causes the processor to:
obtain a new model from an external computing device;
process the new model to identify a set of terms associated with the new model;
associate the new model with a domain with terms that correspond to the identified number of terms associated with the new model; and
store the new model and identified set of terms associated with the new model in a portion of a NoSQL storage node corresponding to the domain.

10. The cloud infrastructure system of claim 8, wherein the non-transitory computer-readable medium further causes the processor to:
generate the feedback data that includes any of the set of parsed data from the dataset, number of terms for the first recommended model that correspond with the set of parsed data, the review output data, and the response message specifying the approval or the rejection of the first recommended model; and
update a portion of the domain ontology store relating to the first recommended model to associate the feedback data with the first recommended model, the feedback data configured to be utilized in a subsequent identification of the first recommended model in a selected recommended model.

11. The cloud infrastructure system of claim 8, wherein identifying the one or more recommended models of the plurality of models comprises identifying models with a greatest number of terms that correspond with the set of parsed data for the dataset.

12. The cloud infrastructure system of claim 8, wherein the non-transitory computer-readable medium further causes the processor to:
derive, for each of the plurality of models, a confidence metric based at least in part on a combination of a number of terms that correspond with the set of parsed data for the dataset, context data for a domain associated with each model, and a usage of each model, the confidence metric indicative of an estimated relevance of each model to the dataset.

13. The cloud infrastructure system of claim 8, wherein the non-transitory computer-readable medium further causes the processor to:
parse column data from spreadsheet or table columns included in the dataset; and
derive metadata of the dataset, wherein the column data and the metadata comprise the set of parsed data that indicate the identified features of the dataset.

14. A non-transitory computer-readable medium including stored thereon a sequence of instructions which, when executed by a processor causes the processor to execute a process, the process comprising:
obtaining a dataset from a client device;
parsing portions of the dataset to derive a set of parsed data identifying features of the dataset;
comparing the set of parsed data with terms associated with each of a plurality of models stored in a domain ontology store of a model catalog to identify a number of terms for each of the plurality of models that correspond with the set of parsed data for the dataset;
identifying one or more recommended models of the plurality of models based at least in part on the identified number of terms for each of the plurality of models that correspond with the set of parsed data;
providing the one or more recommended models to the client device;
obtaining a selection of a first recommended model of the one or more recommended models;
generating review output data based at least in part on a portion of the dataset and the first recommended model;
providing the review output data to the client device; and
obtaining a response message specifying an approval or a rejection of the first recommended model from the client device, and
wherein the identified number of terms for the first recommended model that correspond with the set of parsed data for the dataset, the review output data, and whether the response message indicates that the first recommended model is accepted or rejected is fed into the model catalog as feedback data, wherein the feedback data is used to update the domain ontology store of the model catalog.

15. The non-transitory computer-readable medium of claim 14, wherein identifying the one or more recommended models of the plurality of models comprises identifying models with a greatest number of terms that correspond with the set of parsed data for the dataset.

16. The non-transitory computer-readable medium of claim 14, wherein the process further comprises:
deriving, for each of the plurality of models, a confidence metric based at least in part on a combination of a number of terms that correspond with the set of parsed data for the dataset, context data for a domain associated with each model, and a usage of each model, the confidence metric indicative of an estimated relevance of each model to the dataset.

17. The non-transitory computer-readable medium of claim 14, wherein identifying the one or more recommended models of the plurality of models further comprises:

determining a first domain of a plurality of domains that includes a greatest number of features that correspond with the set of parsed data for the dataset, wherein each of the plurality of domains correspond with a grouping of associated models; and identifying one or more recommended models of the grouping of associated models associated with the first domain based at least in part on the identified number of terms for each of the grouping of associated models that correspond with the set of parsed data.

18. The non-transitory computer-readable medium of claim 14, wherein parsing portions of the dataset to derive the set of parsed data further comprises:

parsing column data from spreadsheet or table columns included in the dataset; and deriving metadata of the dataset, wherein the column data and the metadata comprise the set of parsed data that indicate the identified features of the dataset.

19. The method of claim 1, further comprising:

obtaining a new model from an external computing device;

processing the new model to identify a set of terms associated with the new model;

associating the new model with a domain with terms that correspond to the identified number of terms associated with the new model; and storing the new model and identified set of terms associated with the new model in a portion of a NoSQL storage node corresponding to the domain.

20. The non-transitory computer-readable medium of claim 14, wherein the process further comprises:

obtaining a new model from an external computing device;

processing the new model to identify a set of terms associated with the new model;

associating the new model with a domain with terms that correspond to the identified number of terms associated with the new model; and storing the new model and identified set of terms associated with the new model in a portion of a NoSQL storage node corresponding to the domain.

\* \* \* \* \*